United States Patent [19]
Abe et al.

[11] Patent Number: 5,815,204
[45] Date of Patent: Sep. 29, 1998

[54] STROBE APPARATUS OF A STILL VIDEO CAMERA WITH ADJUSTABLE COLOR TEMPERATURE

[75] Inventors: Tetsuya Abe; Kimiaki Ogawa, both of Tokyo, Japan

[73] Assignee: Asahi Kogaku Kogyo Kabushiki Kaisha, Tokyo, Japan

[21] Appl. No.: 827,709

[22] Filed: Apr. 8, 1997

Related U.S. Application Data

[63] Continuation of Ser. No. 317,867, Oct. 4, 1994, abandoned.

[30] Foreign Application Priority Data

Oct. 4, 1993 [JP] Japan ................................. 5-271298

[51] Int. Cl.$^6$ .................................................. H04N 5/222

[52] U.S. Cl. .............................................. 348/371; 396/98

[58] Field of Search ...................... 348/223, 224,
348/226, 227, 228, 371, 20.71, 230, 655;
354/430, 413, 145.1, 127.1, 126; 396/89,
98, 158

[56] References Cited

U.S. PATENT DOCUMENTS

| | | |
|---|---|---|
| 3,682,056 | 8/1972 | Tokutomi . |
| 4,051,490 | 9/1977 | Kawasaki . |
| 4,485,336 | 11/1984 | Yoshiyama et al. . |
| 4,827,332 | 5/1989 | Miyake et al. .......................... 348/227 |
| 4,847,680 | 7/1989 | Okino . |
| 5,001,552 | 3/1991 | Okino ..................................... 348/224 |
| 5,087,936 | 2/1992 | Ogata et al. ............................. 354/430 |
| 5,097,344 | 3/1992 | Aoki et al. .............................. 358/310 |
| 5,155,581 | 10/1992 | Tanaka et al. .......................... 348/371 |
| 5,172,146 | 12/1992 | Wooldridge ............................. 354/430 |
| 5,424,798 | 6/1995 | Takagi .................................... 354/430 |
| 5,485,201 | 1/1996 | Aoki et al. . |

Primary Examiner—Victor R. Kostak
Attorney, Agent, or Firm—Greenblum & Bernstein, P.L.C.

[57] ABSTRACT

A strobe apparatus includes a light emitter which emits strobe light toward an object to be photographed, and a color temperature detector which detects a color temperature of ambient light reflected by the object. A controller varies a color temperature of the strobe light in accordance with the color temperature of the reflected ambient light. Thus, the color temperature of the object is made substantially identical to a predetermined value corresponding to a specific spectral sensitivity of an image pickup device.

40 Claims, 5 Drawing Sheets

STROBE APPARATUS OF A STILL VIDEO CAMERA WITH ADJUSTABLE COLOR TEMPERATURE

This application is a continuation of application Ser. No. 08/317,867, filed Oct. 4, 1994, now abandoned.

BACKGROUND OF THE INVENTION

1. Field of the Invention

The present invention relates to a strobe apparatus for a still video camera having an image pickup device in which the color temperature of strobe light is controlled to obtain a natural color image even for images having a large step change in color.

2. Description of the Related Art

In a conventional still video camera, the white light balance is adjusted so that a white object, when photographed, is reproduced as a white image, based on light reflected from the object, regardless of the color temperature of the illumination light used to illuminate the object. For instance, in a known still video camera having a strobe apparatus (electronic flash), the white balance adjustment is carried out by adjusting the gain of the color difference signals (R-Y, B-Y) for example an object image, etc., output from a solid-state image pickup device. In the case where a strobe apparatus is activated to emit a strobe light, the white balance is controlled in accordance with a predetermined color temperature of the strobe light.

To this end, in conventional still video cameras, a white balance circuit is provided. If the color temperature of light incident upon the image pickup device is different from a predetermined color temperature value determined in accordance with the spectral sensitivity of the image pickup device, a false color signal is produced. This occurs particularly at the boundary portion between white and black colors in the vertical direction of the image. However, no false color signal can be eliminated by the white balance adjustment. It is necessary to provide a vertical edge extracting circuit in order to remove the false color signal. This results in a complicated white balance circuit.

SUMMARY OF THE INVENTION

The primary object of the present invention is to provide a simple strobe apparatus in which a natural color image can be obtained without providing a white balance circuit or a vertical edge extracting circuit.

To achieve the object mentioned above, according to the present invention, there is provided a strobe apparatus comprising a light emitting device for emitting a strobe light towards the object to be photographed, a color temperature detecting mechanism for detecting the color temperature of the ambient light on the object, and a control mechanism for varying the color temperature of the strobe light in accordance with the color temperature of the ambient light, so that the color temperature of the object is substantially identical to a predetermined value corresponding to a spectral sensitivity of an associated image pickup device.

Preferably, the light emitting device comprises first and second light emitting tubes which emit different color temperatures of strobe light.

The first and second light emitting tubes can be provided, on the peripheral surfaces thereof, with different colored filters.

Furthermore, provision is made for monochrome liquid crystal filters to be provided in front of the first and second light emitting tubes to control the quantity of light to be transmitted. The control mechanism controls the density of the monochrome liquid crystal filters.

The present disclosure relates to subject matter contained in Japanese patent application No. 5-271298 (filed on 4 Oct., 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
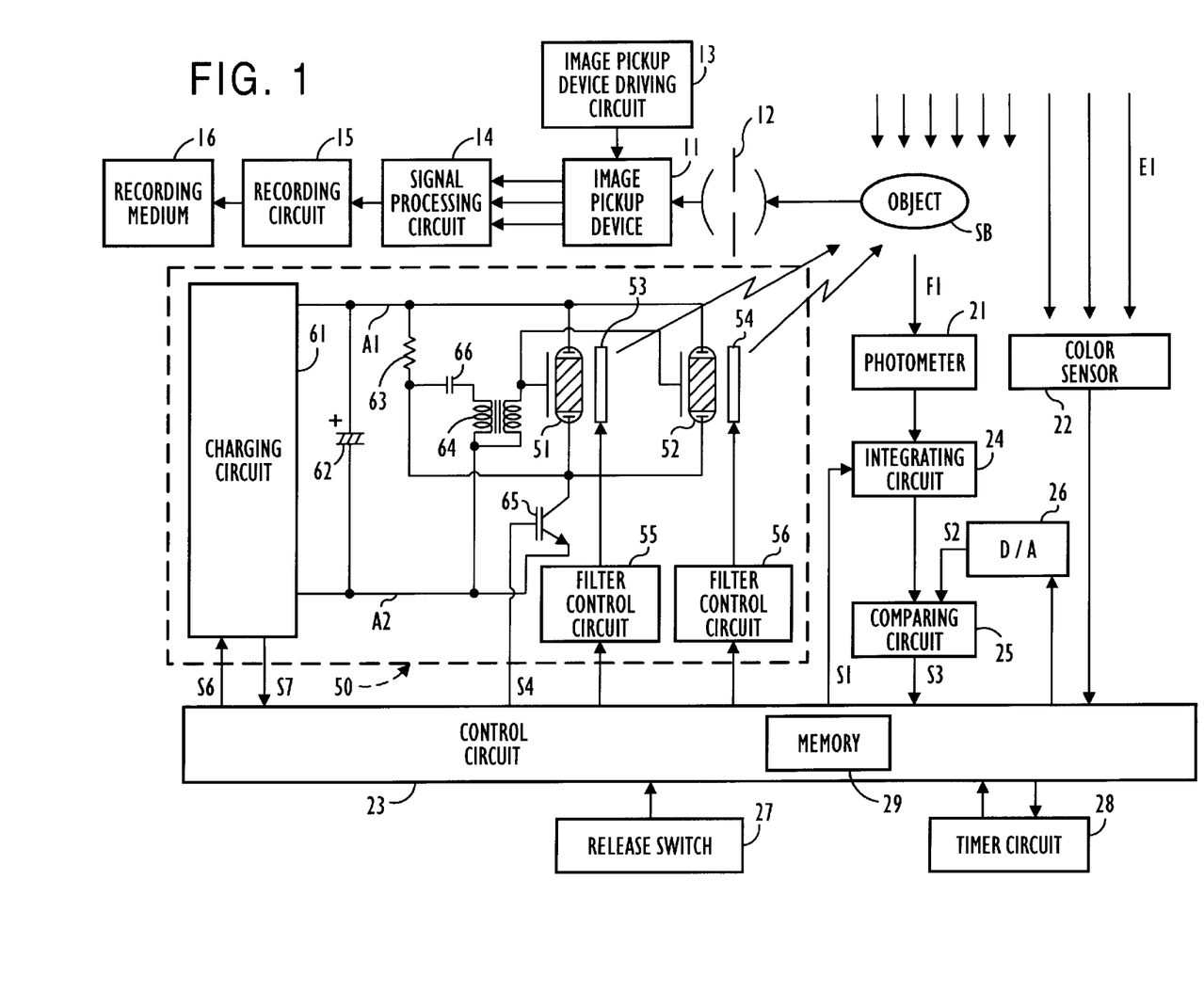
FIG. 1 is a circuit diagram of a still video camera to which the present invention is applied.

Referring to FIG. 1 which shows a block diagram of a control circuit for a still video camera to which an embodiment of a strobe apparatus is applied, an image of an object SB to be photographed is formed on a light receiving surface of a solid-state image pickup device 11 by a taking lens L. A diaphragm 12 is provided in an optical path of i.e., photographing the taking lens L to control the quantity of light to be made incident upon the solid-state image pickup device 11 from the object SB. The image pickup device 11 is driven in accordance with, for example, shift pulses, generated by an image pickup device driving circuit 13. Consequently, image signals (R-signal, G-signal and B-signal) produced by the image pickup device 11 in accordance with an object image formed on the light receiving surface thereof, are successively read from the image pickup device 11 and inputted to a signal processing circuit 14. Namely, in the illustrated embodiment, there is no amplifier for the white balance between the image pickup device 11 and the signal processing circuit 14, unlike the conventional still video cameras.

The image signals are converted to a predetermined format of recording signals in the signal processing circuit 14 and inputted to a recording circuit 15 in which the recording signals are recorded on a recording medium 16, such as a magnetic disc.

The photometer (sensor) 21 which is made of, for example, a photoelectric transducer such as a photodiode receives the light F1 reflected from the object SB and converts the same into electric signals to indicate a luminance of the object SB. A color sensor 22, which is comprised of a plurality of photoelectric transducers having different spectral sensitivities to visible light is provided to detect the color temperature of the ambient light E1 of the object SB. The color temperature data thus obtained is inputted to a control circuit 23, so that the color temperature of the light to be emitted from the strobe apparatus 50 can be determined in accordance with the color temperature data, as will be discussed hereinafter.

The photometer 21 is connected to an integrating circuit (integrator) 24 which integrates the electric signals outputted from the photometer 21 in response to an integration commencement signal S1. The integrating circuit 24 is connected to the control circuit 23 through a comparing circuit 25 which is in turn connected to a D/A converter 26. The comparing circuit 25 compares the voltage (signal S2) inputted from the D/A converter 26 and the integral value inputted from the integrating circuit 24. When the integral value is identical to the voltage (signal S2), a quenching signal S3 is sent to the control circuit 23. The control circuit 23 causes xenon tubes 51 and 52 to stop the light emission in accordance with the quenching signal S3.

The strobe apparatus 50 is connected to the control circuit 23, so that the commencement and completion of the emission of the strobe light by the xenon tubes 51 and 52 of the strobe apparatus 50 are controlled by the control circuit (controller) 23. The first xenon tube 51 emits strobe light whose color temperature is low. To this end, the first xenon tube 51 is provided, on the outer peripheral surface thereof, with an amber filter coated thereon. The second xenon tube 52 emits strobe light whose color temperature is high. To this end, the second xenon tube 52 is provided, on the outer peripheral surface thereof, with a blue filter coated thereon. Guest-host type of monochrome liquid crystal filters 53 and 54 are provided respectively in front of the first and second xenon tubes 51 and 52. The densities of the monochrome liquid crystal filters 53 and 54 are varied depending on the amplitude of the voltage to be applied thereto, and controlled by the respective filter control circuits 55 and 56 that operate in response to control signals outputted from the controller 23.

A signal line A1 connected to the positive terminal of a charging circuit 61 is connected to a positive electrode of the main condenser 62, the resistor 63 and the anode terminals of the xenon tubes 51 and 52. A signal line A2 connected to the negative terminal of the charging circuit 61 is connected to a negative electrode of the main condenser 62, the common terminal of a trigger transformer 64, and an emitter of the insulation gate bipolar transistor (IGBT) 65. The main condenser 62 accumulates electric charge in accordance with an impulse voltage applied thereto by the charging circuit 61 through the signal line A1. The low-voltage coil of the trigger transformer 64 is connected to one end of the resistor 63 through a trigger condenser 66. The one end of the resistor 63 is also connected to the cathodes of the xenon tubes 51 and 52.

The base of the IGBT 65 is connected to the control circuit 23, so that when the IGBT is activated in response to an emission trigger signal S4 outputted from the control circuit 23, the electric current flows from the collector of the IGBT 65 to the emitter thereof. Consequently, the electric charge of the trigger condenser 66 is discharged, so that the electric current is supplied to the low-voltage coil of the trigger transformer 64, resulting in an induction of a trigger pulse in the high voltage coil thereof. The trigger pulse is applied to the trigger electrodes of the xenon tubes 51 and 52, so that the anodes and cathodes thereof are connected. As a result, the electric charges of the main condenser 62 are discharged, so that the xenon tubes 51 and 52 emit strobe lights F2 and F3.

A release switch 27 and a timer circuit 28, both provided in the still video camera, are connected to the control circuit 23, so that various controls are effected by the operation of the release switch 27. Data for determining the density of the monochrome liquid crystal filters 53 and 54 is stored in a memory 29 provided in the control circuit 23.

Figure 2:
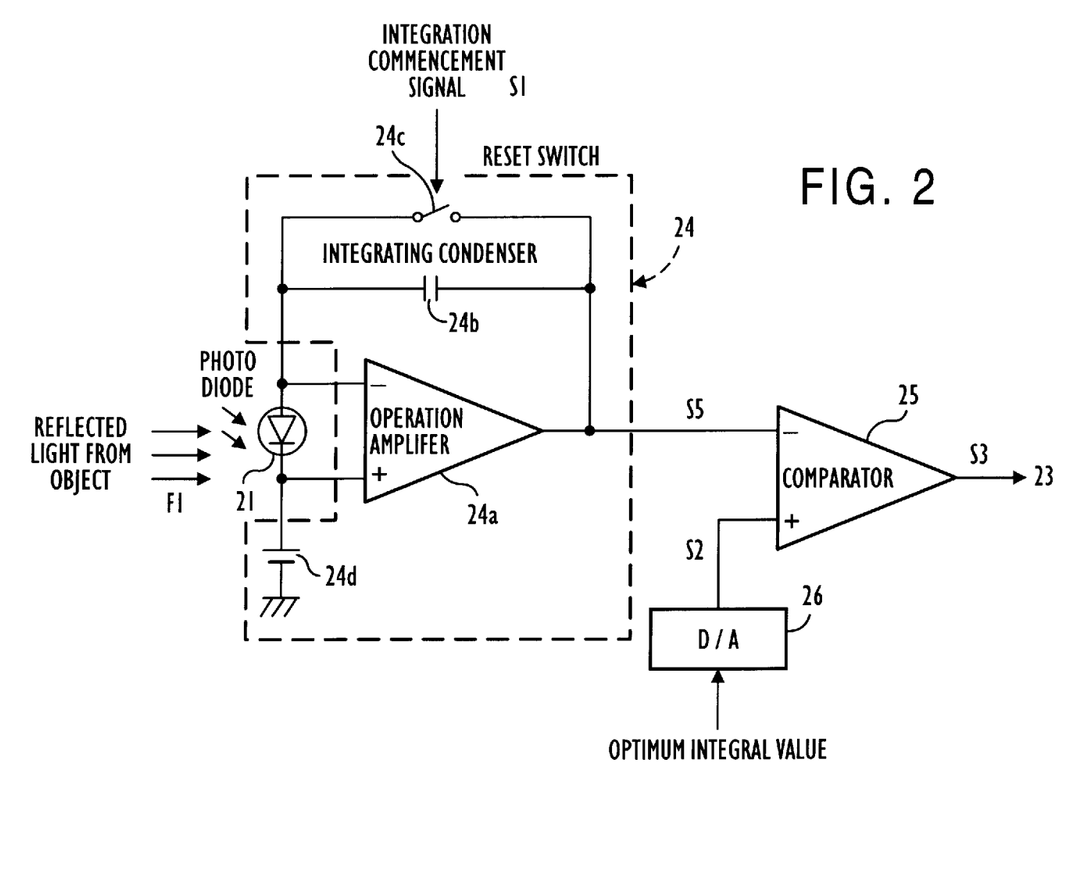
FIG. 2 is a block diagram of a photometer, an integrating circuit (integrator) and a comparing circuit according to the present invention.

FIG. 2 shows an electrical connection of the photometer 21, the integrating circuit 24, the comparing circuit (comparator) 25, and the D/A converter 26. The integrating circuit 24 has an operation amplifier 24a, an integrating condenser 24b, and a reset switch 24c. The photometer 21 is comprised of a photodiode which is connected to an inverted signal input terminal and a non-inverted signal input terminal of the operation amplifier 24a. The non-inverted signal input terminal of the operation amplifier 24a is connected to a reference power source 24d, so that a reference voltage before the commencement of the integration is applied to the operation amplifier 24a.

The integrating condenser 24b and the reset switch 24c are connected in parallel between the inverted signal input terminal and the non-inverted signal input terminal of the operation amplifier 24a, so that the operation of the reset switch 24c is controlled in accordance with the integration commencement signal S1 inputted from the control circuit (controller) 23. When the reset switch 24c is opened, the photoelectric current produced in the photometer 21 is integrated by the operation amplifier 24. The output terminal of the operation amplifier 24a is connected to the inverted signal input terminal of the comparator 25.

The D/A converter 26 is connected to the non-inverted signal input terminal of the comparator 25 in which the voltage value of the output signal S2 of the D/A converter 26 is compared with the voltage value of the output signal S5 of the operation amplifier 24a. If the voltage value of the signal S5 is lower than the voltage value of the signal S2, the quenching signal S3 is outputted from the comparing circuit 25 to the control circuit 23. The voltage value of the signal S2 is determined in accordance with digital data supplied to the D/A converter 26 from the controller 23. The setting of the voltage value of the signal S2 is carried out by an optimum integral value setting operation, which will be discussed hereinafter.

Figure 3:
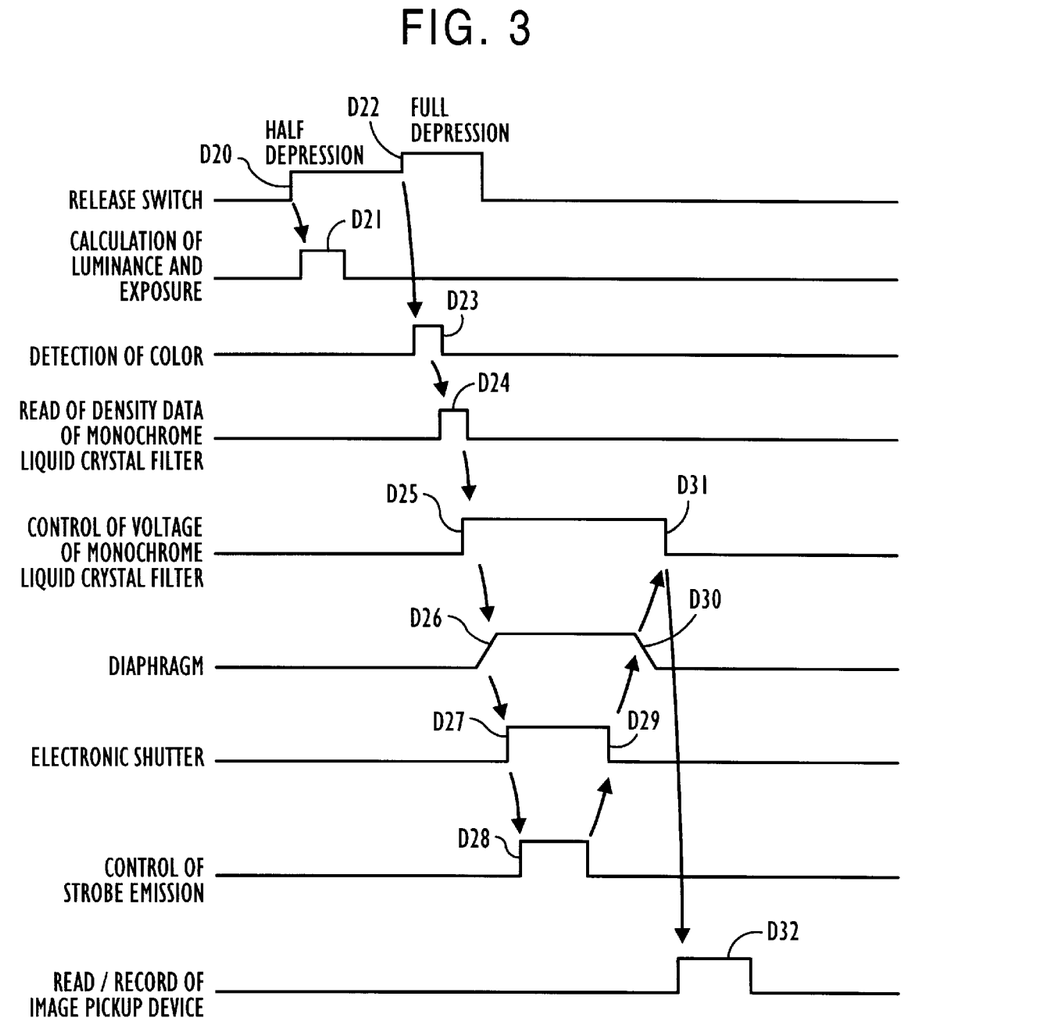
FIG. 3 is a timing chart for a photographing operation of a still video apparatus according to the present invention.
Figure 4:
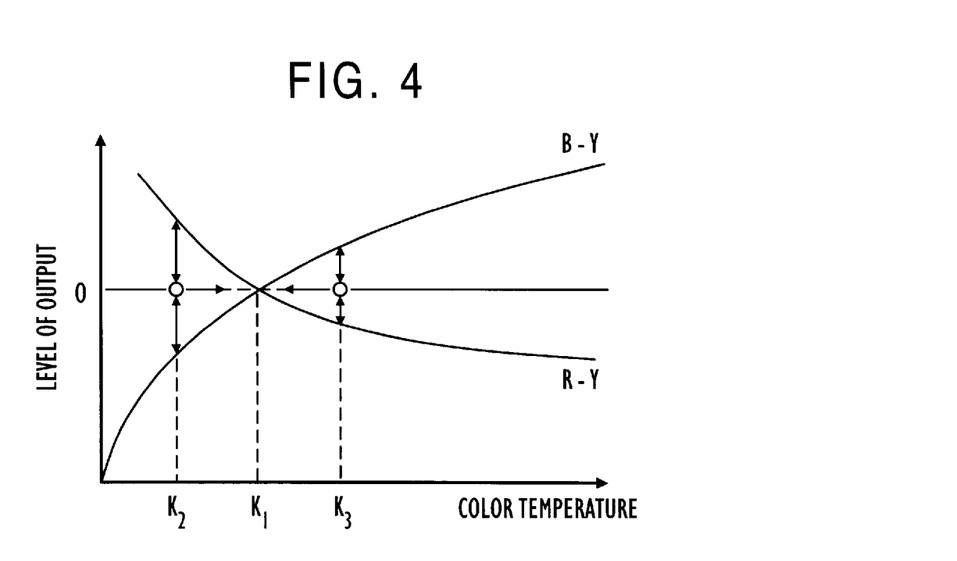
FIG. 4 is a graph showing a relationship between the color temperature of an object and the output level of an image pickup device; and, FIG. 5 is a flow chart of a photographing operation using a strobe apparatus according to the present invention.

FIG. 3 shows a sequence diagram of the emission of the strobe light in the illustrated embodiment. FIG. 4 shows a relationship between the color temperature of the object SB and the level of the output signals of the image pickup device 11. The operation of the above-mentioned embodiment of the present invention will be discussed below with reference to FIGS. 3 and 4.

When the release switch 27 is depressed by a half stroke (step D20), the controller 23 detects the luminance of the object SB in accordance with photometering data which is obtained by a photometer (not shown) different from the photometer 21 and determines an exposure value based on the photometering data (step D21).

In the calculation for determining the exposure value (exposure calculation), the operation time of the electronic shutter of the image pickup device 11 and the quantity of the strobe light to be emitted by the strobe apparatus 50 are determined. The charging operation for the main condenser 62 by the charging circuit 61 is commenced when a main switch (not shown) is turned ON or a strobe-photographing indicating switch, for example (not shown) is actuated, so that the charge commencement signal S6 is outputted from the control circuit 23. The charging operation is commenced when the strobe emission control is completed.

The charging circuit 61 outputs the high voltage current to the main condenser 62 in response to the charge commencement signal S6. Consequently, the electric charges for strobe emission are accumulated by the high voltage current in the main condenser 62. When the main condenser 62 is charged with a predetermined quantity of electric charge, the potential of the signal line A1 reaches a predetermined value, so that the charging circuit 61 no longer outputs the high voltage current. Thus, the accumulation of the electric charge in the main condenser 62 by the charging circuit is completed. Thereafter, a charge completion signal S7, which represents the completion of the accumulation of the charges in the main condenser 62, is outputted from the charging circuit 61 to the control circuit 23. Consequently, the control circuit 23 determines that a picture can be taken using a strobe emission, i.e., the strobe-photographing can be effected.

Upon completion of the calculation of the luminance and exposure value (step D21), when the release switch 27 is fully depressed (step D22), the controller 23 calculates the color temperature of the ambient light E1 of the object in accordance with a signal inputted from the color photometering sensor 22 (step D23).

The color sensor 22 is comprised of at least two photoelectric transducers having different spectral sensitivities within the visible light range. The ratio of the output signals of the photoelectric transducers of different spectral sensitivities does not depend on the total quantity of light received. Therefore, the color temperature of the ambient light E1 can be obtained in the controller 23, using the ratio (or logarithm thereof) of the output signals. The memory 29 of the controller 23 stores a data table which represents a correlation between the signals inputted from the color sensor 22 and the color temperature. Thus, the color temperature of the ambient light E1 can be obtained in accordance with the input signals from the color sensor 22, using the data table.

In the illustrated embodiment, the color temperature of the strobe light to be emitted from the strobe apparatus 50 is determined in accordance with the color temperature of the ambient light E1 thus obtained, as follows (see FIG. 4).

The R-, G-, B-color signals outputted from the image pickup device 11 are combined to produce a luminance signal Y (sum of the intensities thereof), and color difference signals R-Y and B-Y in the signal processing circuit 14, i.e., Y=R+G+B, R−Y=−(G+B), and B−Y=−(R+G) are produced.

The levels of the color difference signals (R-Y) and (B-Y) decrease and increase, respectively, as the color temperature of the ambient light E1 increases, at the level of the image pickup device 11. The output levels of the color difference signals (R-Y) and (B-Y) are identical when the color temperature of the ambient color E1 is a reference value K1 (e.g., K1=4700° K.). When the output levels of the color difference signals (R-Y) and (B-Y) are identical, the color temperature of the strobe light is selected to be identical to the reference value K1.

If the color temperature K2 of the ambient light is lower than the reference value K1, the output level of the color difference signal (R-Y) is higher than the color difference signal (B-Y). In this case, the color temperature K3 of the strobe light is selected to be higher than the reference value K1 by a predetermined value, so that the color temperature of the light reflected from the object and made incident upon the image pickup device 11 is adjusted to be identical to the reference value K1. For instance, if the ambient light is reddish, the bluish strobe light crystal liquid filter adjusts its density to transmit more bluish strobe light while the reddish strobe light liquid crystal adjusts its density to transmit less reddish strobe light. Thereby, the color tone of the object image can be corrected.

Similarly, if the color temperature K2 of the ambient light is higher than the reference value K1, the color temperature K3 of the strobe light is selected to be lower than the reference value K1 by a predetermined value.

The adjustment of the color temperature of the strobe light is carried out by the adjustment of the density of the liquid crystal filters 53 and 54 provided in front of the xenon tubes 51 and 52, respectively. A data table which represents the relationship between the color temperature of the ambient light and the density of the liquid crystal filters 53 and 54 is stored in the memory 29 of the control circuit 23.

Namely, when the color temperature of the ambient light E1 is obtained (step D23), the density data of the monochrome liquid crystal filters 53 and 54 is read, with reference to the data table stored in the memory (step D24). The data thus read is inputted to the filter control circuits 55 and 56. The filter control circuits 55 and 56 determine the control voltage for the filters 53 and 54, in accordance with the inputted data (step D25).

Consequently, the densities of the filters 53 and 54 are selected to be appropriate values so as to control the quantity of light to be transmitted through to thereby adjust the color temperature of the composite light of the strobe lights emitted from the xenon tubes 51 and 52.

Thereafter, the aperture of the diaphragm 12 is adjusted in accordance with the photometering data (luminance data) to adjust the quantity of light reflected from the object and made incident upon the image pickup device 11 (step D26). The time for accumulating the electric charges (photoelectric signals) of the image pickup device 11, i.e., the electronic shutter time is determined in accordance with the photometering data, and the accumulation of the electric charge is commenced (step D27). At the same time as the commencement of the accumulation of the electric charges, the control of the strobe emission is commenced in accordance with the photometering data (step D28).

Upon completion of the photographing operation, the control circuit 23 controls the image pickup device driving circuit 13 to send a control signal to the image pickup device 11 to terminate the accumulation of the electric charge (step D29) and close the diaphragm 12 (step D30). At the same time, the supply of the control voltage to the electrodes of the monochrome liquid crystal filters 53 and 54 is stopped, so that the filters 53 and 54 are brought into an inoperative position (step D31). Thereafter, a read control signal is outputted from the image pickup device driving circuit 13 to the image pickup device 11 to read the signal charges, such as transfer pulses. The signal charges accumulated in the image pickup device 11 are read as image signals and inputted to the signal processing circuit 14 where the image signals are converted to -a predetermined format of image signals and recorded onto the recording medium (not shown) by the recording circuit 15 (step D32).

Figure 5:
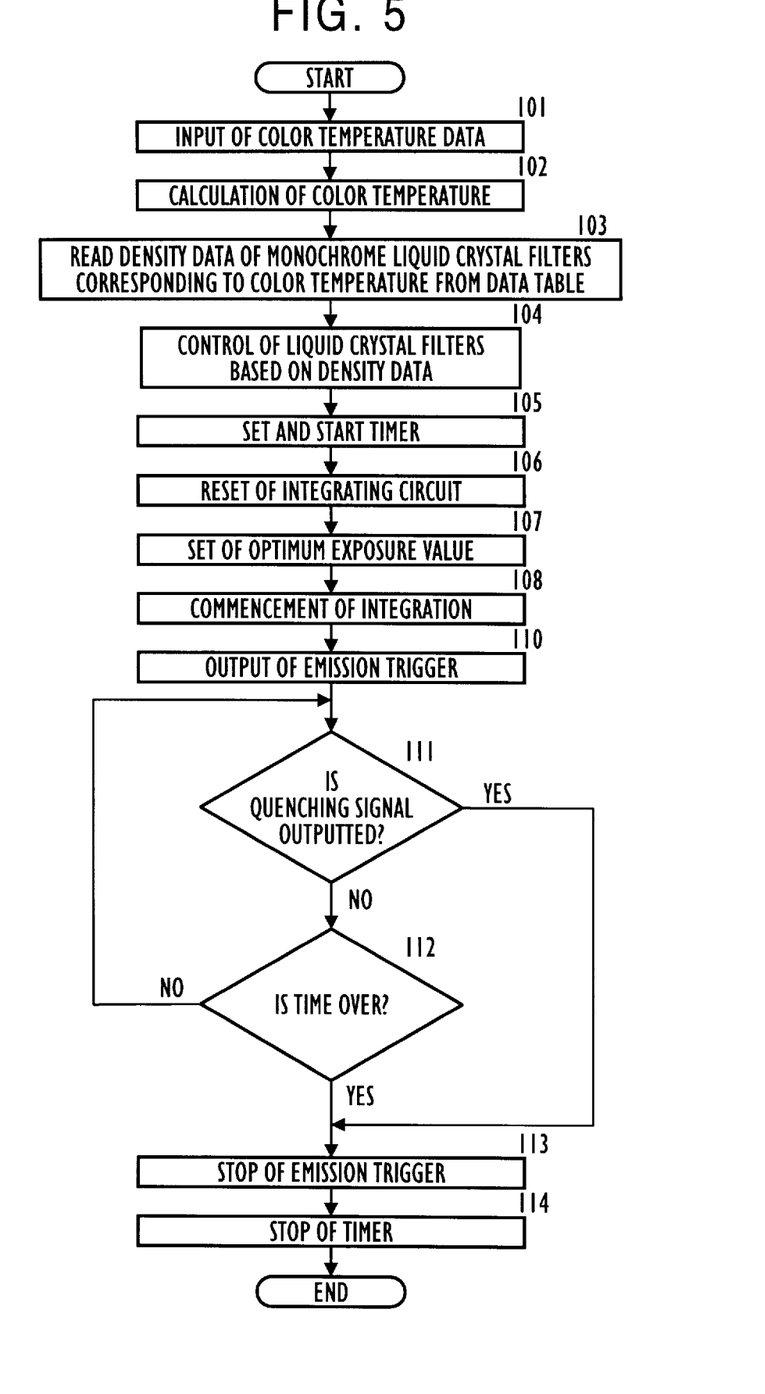

FIG. 5 shows a flow chart of the control of the strobe emission. The emission control is carried out by the control circuit 23. The following discussion will be addressed to the strobe emission control with reference to the flow chart shown in FIG. 5.

The control begins when the release switch is fully depressed.

At step S101, the photometering data (luminance data) detected by the photometer 22 is inputted. At step S102, the color temperature of the ambient light E1 is calculated in accordance with the photometering data. The density data (voltage data) of the monochrome liquid crystal filters 53 and 54 corresponding to the color temperature obtained is determined with reference to the data table stored in the memory 29 of the controller 23 at step S103. Thereafter, at step S104, predetermined voltages are applied to the electrodes of the monochrome liquid crystal filters 53 and 54 in accordance with the density data, so that the densities of the liquid crystal filters 53 and 54 are set at predetermined values.

At step S105, the maximum emission time of the xenon tubes 51 and 52 is set in a timer and the latter begins counting the time. Thereafter, at step S106, the reset signal S1 is inputted to the integrating circuit 24, so that the integral value of the integrating circuit 24 is reset. At step S107, optimum exposure values (digital data) corresponding to the xenon tubes 51 and 52 are outputted to the D/A converter 26 and converted to analogue signals S2 to effect the modulation control of light. The analogue signals are inputted to the comparator 25.

At step S108, the output of the reset signal S1 is stopped, and the reset of the integrating circuit 24 is released, so that the photoelectric current produced in the photometer 21 is integrated by the operation amplifier 24a. Upon commencement of the integration, the emission trigger signal S4 is outputted to the IGBT 65 to turn the latter ON at step S110. As a result, the trigger voltages are applied to the electrodes of the xenon tubes 51 and 52, so that the strobe lights are emitted from the xenon tubes 51 and 52.

The quantity of light F1 reflected from the object SB increases due to the strobe emission. When the integral value of the integrating circuit 24 is identical to the value of the signal S2 (optimum exposure value), the comparing circuit 25 issues a quenching signal S3. When the issuance of the quenching signal S3 is confirmed at step S111, the output of the emission trigger signal S4 is stopped at step S113, and the emission of the strobe light by the xenon tubes 51 and 52 is terminated. If there is no output of the quenching signal S3 at step S111, or the time set in the timer is checked at step S112. If no set time has lapsed at step S112, the control is returned to step S111 to check whether the quenching signal S3 is outputted. Conversely, if the set time of the timer is over at step S112, the control proceeds to step S113 to stop the output of the emission trigger signal S4. When no emission trigger signal S4 is outputted, the IGBT 65 is turned OFF and the emission of the strobe light by the xenon tubes 51 and 52 is stopped. Thereafter, at step S114, the timer is stopped and the program ends.

As can be seen from the above discussion, according to the present invention, no white balance adjustment is effected to adjust the gain of the color difference signals. Unlike the prior art in which the white balance adjustment must be carried out, no white balance circuit is necessary in the present invention.

Moreover, according to the present invention, since the color temperature of the strobe light emitted from the xenon tubes 51 and 52 is adjusted so that the color temperature of the illumination light of the object to be photographed is substantially identical to a predetermined color temperature corresponding to the spectral sensitivity of the image pickup device, no false color signal is produced at the edge portion of the object image in the vertical direction. Consequently, no vertical edge extracting circuit is required to eliminate the false color signal in the present invention, resulting in a simple strobe apparatus.

The number of the xenon tubes 51 and 52 is not limited to two and can be three or more than three. Furthermore, only one monochrome liquid crystal filter can be provided in front of one of the xenon tubes 51 and 52.

As can be understood from the foregoing, according to the present invention, a natural color image can be obtained by a simple structure without a white balance circuit or a vertical edge extracting circuit.

We claim:

1. A strobe apparatus of a still video camera having an image pickup device comprising:
    light emitting means for emitting strobe light toward an object to be photographed;
    color temperature metering means for metering a color temperature of the ambient light reflected from said object;
    emitting control means for varying a color temperature of said strobe light in accordance with said color temperature of the ambient light, so that said color temperature of said object is substantially identical to a predetermined value corresponding to a specific spectral sensitivity of said image pickup device;
    said light emitting means comprising first and second light emitting tubes which emit different color temperatures of strobe light; and
    monochrome liquid crystal filters provided in front of said first and second light emitting tubes to control a quantity of light transmitted by said first and second light emitting tubes.

2. A strobe apparatus according to claim 1, said first and second light emitting tubes having, on the peripheral surfaces thereof, different colored filters.

3. The strobe apparatus of a still video camera according to claim 1, wherein said emitting control means comprises optical means for controlling the color temperature of said strobe light.

4. A strobe apparatus according to claim 1, said emitting control means controlling a density of said monochrome liquid crystal filters.

5. A strobe apparatus according to claim 4, further comprising memory means for storing a data table which represents a correlation between the signal inputted from a color sensor and color temperature of said ambient light.

6. A strobe apparatus according to claim 5, said emitting control means controlling said density of said monochrome liquid crystal filters according to said input signals from said color sensor, using said data table stored in said memory means.

7. A strobe apparatus according to claim 4, said first and said second light emitting means commence emitting light at a same time.

8. A strobe apparatus according to claim 4, said first and second light emitting means emit light for a same duration.

9. A still video camera with a strobe apparatus having a color image pickup device for converting an object image to electrical signals including three color signals comprising:
    recording means for recording said electrical signals, said recording means having emitting means for emitting strobe light toward an object to be photographed;
    color temperature metering means for metering a color temperature of the ambient light reflected from said object;
    optical means for performing white balance adjustment for varying a color temperature of said strobe light in accordance with said color temperature of the ambient light, to achieve a white balance of two color signals of said three color signals output from said color image pickup device;
    said emitting means comprising first and second light emitting tubes which emit different color temperatures of strobe light; and
    monochrome liquid crystal filters provided in front of said first and second emitting tubes to control a quantity of light transmitted by said first and second light emitting tubes.

10. A still video camera according to claim 9, wherein said first and second light emitting tubes having, on the peripheral surfaces thereof, different colored filters.

11. A still video camera according to claim 10, said optical means controlling a density of said monochrome liquid crystal filters.

12. A still video camera according to claim 11, further comprising memory means for storing a data table which represents a correlation between the signal inputted from a color sensor and color temperature said ambient light.

13. A still video camera according to claim 12, said emitting control means controlling said density of said monochrome liquid crystal filters according to said input signals from said color sensor, using said data table stored in said memory means.

14. A still video camera according to claim 11, said first and said second light emitting tubes commence emitting light at a same time.

15. A still video camera according to claim 11, said first and said second light emitting tubes emitting light for a same duration.

16. A strobe apparatus of a still video camera having an image pickup device comprising:
    first and second light emitting tubes for emitting different color temperatures of strobe light toward an object to be photographed;
    a color temperature measuring device for measuring a color temperature of ambient light reflected by said object;
    emitting control means for varying a color temperature of said strobe light in accordance with said color temperature of the ambient light, so that said color temperature of said object is substantially identical to a predetermined value corresponding to a specific spectral sensitivity of said image pickup device; and
    first and second color filters each of a different color on peripheral surfaces of said first and second light emitting tubes, respectively.

17. The strobe apparatus of claim 16, wherein said emitting control means controls a density of said first and second monochrome liquid crystal filters.

18. The strobe apparatus of claim 17, further comprising a memory which stores a data table, wherein data in said data table represents a correlation between a signal from a color temperature measuring device and color temperature of said ambient light.

19. The strobe apparatus of claim 18, wherein said emitting control means controls said density of said monochrome liquid crystal filters according to said signal from said color temperature measuring device and said data.

20. A strobe apparatus of a still video camera having an image pickup device comprising:
    first and second light emitting tubes for emitting different color temperatures of strobe light toward an object to be photographed;
    a color temperature measuring device for measuring a color temperature of ambient light reflected by said object;
    emitting control means for varying a color temperature of said strobe light in accordance with said color temperature of the ambient light, so that said color temperature of said object is substantially identical to a predetermined value corresponding to a specific spectral sensitivity of said image pickup device; and
    first and second monochrome liquid crystal filters, provided in front of said first and second light emitting tubes, respectively, which control a quantity of light transmitted by said first and second light emitting tubes.

21. The strobe apparatus of claim 20, wherein said first and second light emitting tubes commence emitting light at a same time.

22. The strobe apparatus of claim 20, wherein said first and second light emitting tubes emit light for a same duration.

23. The strobe apparatus of claim 20, wherein said emitting control means controls a density of said first and second monochrome liquid crystal filters.

24. The strobe apparatus of claim 23, further comprising a memory which stores a data table, wherein data in said data table represents a correlation between a signal from a color temperature measuring device and color temperature of said ambient light.

25. The strobe apparatus of claim 20, wherein said first and second light emitting tubes commence emitting light at a same time.

26. The strobe apparatus of claim 20, wherein said first and second light emitting tubes emit light for a same duration.

27. A still video camera with a strobe apparatus having a color image pickup device for converting an object image to electrical signals including three color signals, comprising:
    recording means for recording said electrical signals, said recording means having emitting means for emitting strobe light toward an object to be photographed;
    said emitting means including first and second light emitting tubes for emitting different color temperatures of light;
    first and second colored filters, each of a different color, on peripheral surfaces of said first and second light emitting tubes, respectively;
    a color temperature measuring device for measuring a color temperature of the ambient light reflected from said object; and
    white balance adjusting means for varying a color temperature of said strobe light in accordance with said color temperature of the ambient light, to achieve a white balance of two color signals of said three color signals output from said color image pickup device.

28. A still video camera with a strobe apparatus having a color image pickup device for converting an object image to electrical signals including three color signals, comprising:
    recording means for recording said electrical signals, said recording means having emitting means for emitting strobe light toward an object to be photographed;
    said emitting means including first and second light emitting tubes for emitting different color temperatures of light;
    a color temperature measuring device for measuring a color temperature of the ambient light reflected from said object;
    white balance adjusting means for varying a color temperature of said strobe light in accordance with said color temperature of the ambient light, so that a white balance of two color signals of said three color signals output from said color image pickup device is completed; and
    first and second monochrome liquid crystal filters, provided in front of said first and second light emitting tubes to control a quantity of light transmitted by said first and second light emitting tubes.

29. The strobe apparatus of claim 27, wherein said emitting means controls a density of said first and second monochrome liquid crystal filters.

30. The strobe apparatus of claim 29, further comprising a memory which stores a data table, wherein data in said data table represents a correlation between a signal from said color temperature measuring device and color temperature of said ambient light.

31. The strobe apparatus of claim 29, wherein said emitting control means controls said density of said monochrome liquid crystal filters according to said signal from said color temperature measuring device and said data.

32. The strobe apparatus of claim 28, wherein said first and second light emitting tubes commence emitting light at a same time.

33. The strobe apparatus of claim 28, wherein said first and second light emitting tubes emit light for a same duration.

34. The strobe apparatus of claim 27, wherein said emitting means controls a density of said first and second monochrome liquid crystal filters.

35. The strobe apparatus of claim 27, further comprising a memory which stores a data table, wherein data in said data table represents a correlation between a signal from said color temperature measuring device and color temperature of said ambient light.

36. The strobe apparatus of claim 35, wherein said emitting control means controls said density of said monochrome liquid crystal filters according to said signal from said color temperature measuring device and said data.

37. The strobe apparatus of claim 27, wherein said first and second light emitting tubes commence emitting light at a same time.

38. The strobe apparatus of claim 27, wherein said first and second light emitting tubes emit light for a same duration.

39. The strobe apparatus of a still video camera according to claim 31, wherein said emitting control means comprises optical means for controlling the color temperature of said strobe light.

40. The strobe apparatus of claim 24, wherein said emitting control means controls said density of said monochrome liquid crystal filters according to said signal from said color temperature measuring device and said data.

* * * * *